2,868,950

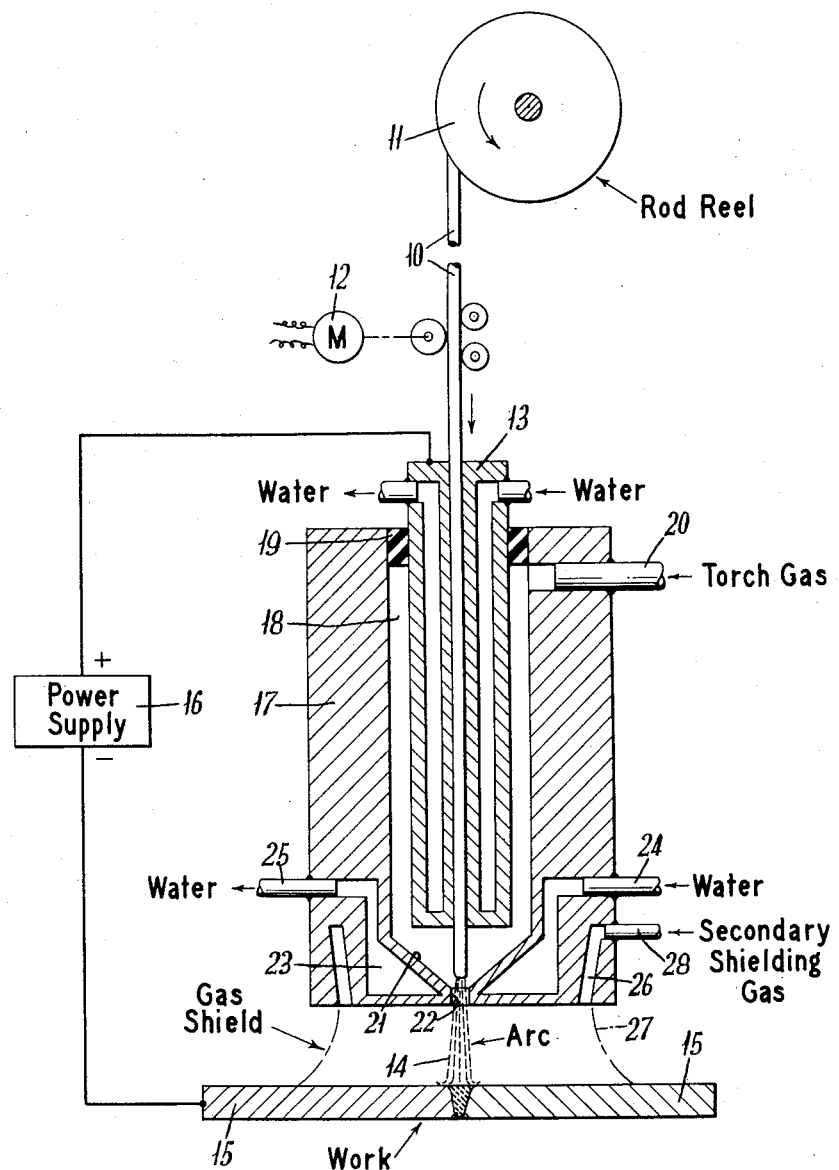

ELECTRIC METAL-ARC PROCESS AND APPARATUS

Robert M. Gage, Indianapolis, Ind., assignor to Union Carbide Corporation, a corporation of New York Application November 13, 1956, Serial No. 621,878

4 Claims. (Cl. 219—74)

This invention relates to shaped electric arcs of the type disclosed by my application Serial No. 524,353, filed July 26, 1955, now Patent No. 2,806,124, of which the present case is a continuation-in-part, and more particularly to electric work-in-circuit constricted metal-arc working with a consumable metal electrode.

According to the present invention there is provided an improved method of constricted metal-arc welding, for example, which involves the following steps: (1) drawing a high pressure arc between the end of at least one fusible-metal electrode and a workpiece; (2) wall-constricting and stabilizing such arc in a nozzle having an orifice through which such arc is drawn; (3) feeding a suitable arc gas through said orifice with such arc in the direction of said workpiece; (4) melting such end of the electrode into discrete molten droplets which pass with such arc and gas through said orifice from which they are discharged and deposited on said workpiece; and (5) feeding said electrode toward such arc as the end thereof is so melted.

This process is useful for high-current, high-speed welding of relatively thick metal stock.

Operation of the present invention is quite unexpected in that the metal-arc wall stabilizing and constricting orifice is neither destroyed nor plugged with molten metal from the consumable electrode.

The invention provides new and unexpected advantages over prior sigma (shielded-inert-gas-metal-arc) welding such as that of Muller et al. 2,504,868, including the following: (1) Greater control of penetration through control over the arc gas flow through the orifice. The gas passing through the arc-torch orifice is an effective heat and momentum carrier to the weld zone and is effective to control the heating of the weld zone and the depression of the molten metal for the purpose of achieving the desired penetration and at the same time controlling the dilution of the deposited weld metal. (2) More effective welding atmosphere control in position welding and in the presence of cross-drafts. The highly direction-stable effluent gas stream is not easily disturbed. (3) Lessened electrical disturbances of the arc. The normal sigma welding arc is deflected by electrical forces on start-up or when leaving the tail-end of the workpiece and similarly when passing clamps or the like in proximity to the weld. The present arc-torch effluent is less affected by such disturbances.

In the drawing the single figure is a vertical cross-sectional view of a constricted arc torch illustrating the invention.

As shown in Fig. 1 a fusible metal wire or rod 10 is drawn from a reel 11 by a rod feed motor 12 and fed through a water-cooled electrical contact tube 13 toward a high-pressure arc 14 that is energized between the end of such rod and workpieces 15 by an electrical power supply 16. The tube 13 is surrounded by a torch body 17 to provide an annular gas passage 18 that is sealed at the top by an electrical insulator 19 to prevent the escape of gas that is fed into the passage via an inlet 20. Such gas flows downwardly around the tube 13 to a conical bottom surface 21 which directs the gas to an orifice 22 that is concentric with the arc 14. The orifice wall is provided with an annular cooling water passage 23 through which water circulates from an inlet 24 to an outlet 25. A secondary annular gas shield 27 is provided around the arc by an annular gas outlet passage 26 in the base of the torch body 17. A suitable secondary gas is supplied to the outlet passage through an inlet 28. Operation of the set-up of Fig. 1 will be understood from the following examples which disclose actual operating conditions of the invention.

*Example I*

A water-cooled copper nozzle having an orifice, 3/16-in. in diameter, was mounted at the arc outlet of a consumable electrode torch. Argon gas at 30 C. F. H. was passed down through the torch and out of such orifice while an arc was energized between the consumable wire electrode and a steel base plate at 150–200 amperes and 35 volts D. C. R. P. The resulting effluent was relatively "hard" and "stiff" and quickly pierced a hole in the base plate. This effluent was also useful for metal cutting, welding, and piercing.

*Example II*

An arc torch comprising a 7/16-in. diameter water-cooled guide tube positioned 3/16-in. from a 1/4-in. diameter x 3/32-in. long orifice in water-cooled copper nozzle was employed for this example. Argon gas at 50 C. F. H. was passed down through the torch and out of the nozzle while a 1/16-in. diameter carbon steel welding wire electrode was fed down through the guide tube. A direct current reverse polarity arc of about 30 volts and 400 amperes was started by contacting the end of such wire to a 1-in. thick cold-rolled steel base plate (also an electrode). The wire melt-off point was initially below the nozzle face. It was slowly retracted into the nozzle orifice by increasing the arc voltage. The resulting welding bead on the base plate changed from a high contour to a lower broadened contour as the wire meltoff point moved back into the orifice. The effluent arc plasma also became visibly collimated.

The above examples employed argon as the shielding gas, but other gases or gas mixtures can be used as long as they are metallurgically acceptable to the electrodes and torch nozzle.

*Example III*

An arc torch comprising a 3/8-in. diameter water-cooled guide tube positioned about 1/4-in. from a 5/16-in. diameter orifice of water-cooled copper nozzle was used (see Fig. 1). Argon gas containing 5% oxygen at 5 C. F. H. was passed down through the torch and out of the nozzle. Additional shielding gas at 50–60 C. F. H. was introduced around the outer circumference of the torch nozzle for protection of the weld puddle. A 1/16-in. diameter type 304 stainless steel welding wire was fed down through the tube at a feed rate of 23 3/4 feet/minute. A D. C. R. P. arc of 440 amperes and 46 volts was maintained between the welding wire electrode and two 1/2-in. thick type 304 stainless steel plates. Such plates were placed 1/8-in. apart and had a 45° bevel 3/16-in. deep as edge preparation. A single pass weld between the two plates of satisfactory penetration was obtained at a welding speed of about 15 I. P. M. Torch-to-work distance was 1/2-in. during this run.

It has been found that the welding results obtained with the present invention are improved arc stability, better control over arc position, and improved weld bead contour when compared to prior sigma welding of the prior art.

What is claimed is:

1. Process which comprises drawing a high-pressure arc between the end of an elongated fusible metal electrode and a workpiece, constricting and wall-stabilizing such arc with a nozzle having an orifice through which said arc passes, feeding a suitable arc gas through said orifice with such arc in the direction of said workpiece, melting such end of the electrode into discrete molten droplets which pass with such arc and gas through said orifice from which they are discharged toward said workpiece, and feeding said electrode toward such arc as the end thereof is so melted.

2. Process of electric arc working with a bare electrode in the form of a wire of fusible metal connected to a source of electric current, wherein an arc is struck between said electrode and a metal workpiece connected to said source, and an inert gas is simultaneously fed to shield the arc as said electrode is consumed by such arc, characterized in that said arc is constricted and wall-stabilized by a water-cooled nozzle having an orifice located between the end of said electrode and said workpiece, from which orifice an effluent composed of said arc and gas and molten metal droplets from said electrode is discharged toward said workpiece in the form of a stable jet of definite shape and direction.

3. Apparatus for gas-shielded electric metal-arc working with a consumable electrode comprising means for feeding an annular stream of a gaseous medium in the direction of the electrode and surrounding the same to shield the arc between the electrode and the workpiece with an envelope of gas, means for feeding the wire electrode toward the arc concentrically within said stream of gas, means for supplying current to the electrode and workpiece at a strength sufficient to consume the wire electrode and maintain the arc as metal is transferred from the electrode to the workpiece entirely within said envelope of gas, and water-cooled orifice means located between said electrode and workpiece for laterally wall stabilizing said arc and controlling the resultant effluent in shape and direction.

4. Process which comprises drawing a high-pressure arc between the end of an elongated fusible electrode and a workpiece, constricting and wall-stabilizing such arc, feeding a suitable gas with such arc in the direction of said workpiece, supplying sufficient current to said arc for melting such end of the electrode into discrete molten droplets which pass with such constricted and wall-stabilized arc and gas toward such workpiece, and feeding said electrode toward such arc as the end thereof is so melted.

References Cited in the file of this patent

UNITED STATES PATENTS

| | | |
|---|---|---|
| 1,002,721 | Mathers | Sept. 5, 1911 |
| 2,550,495 | Pilia | Apr. 24, 1951 |
| 2,587,331 | Jordan | Feb. 26, 1952 |
| 2,776,361 | Essig | Jan. 1, 1957 |